June 9, 1942.  H. F. TÖNNIES  2,285,761
PHOTOGRAPHIC EXPOSURE APPARATUS
Filed Aug. 30, 1938  5 Sheets-Sheet 2
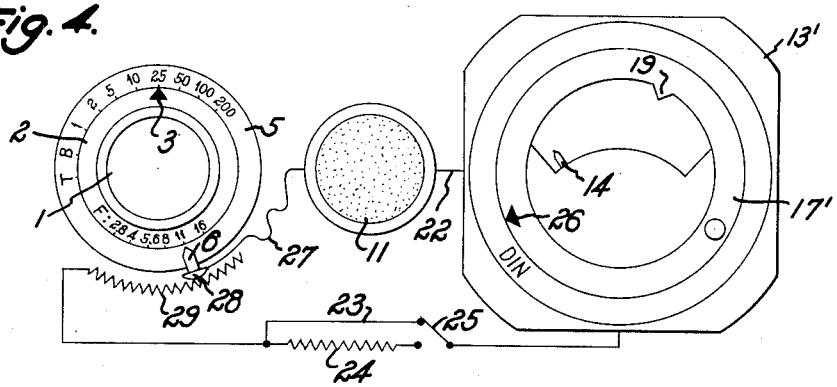
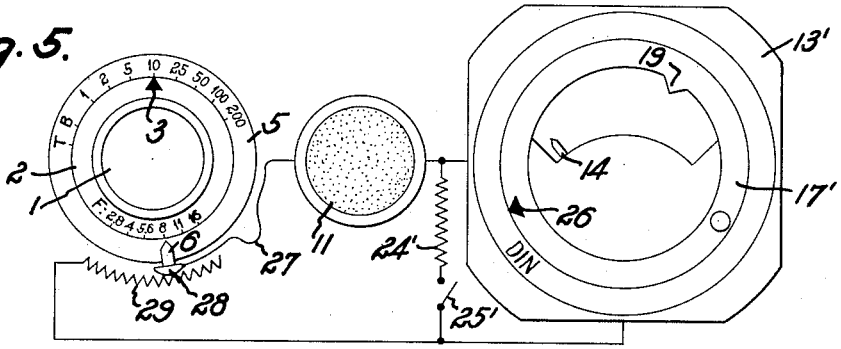
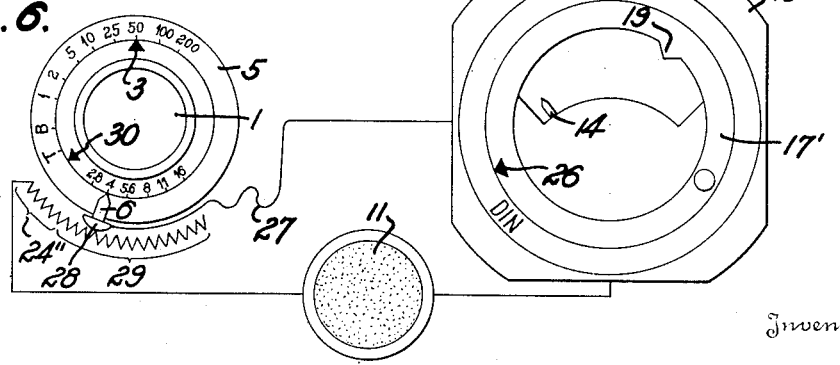
Inventor:
Hans Ferdinand Tönnies,
By Potter, Pierce & Scheffler,
Attorneys.

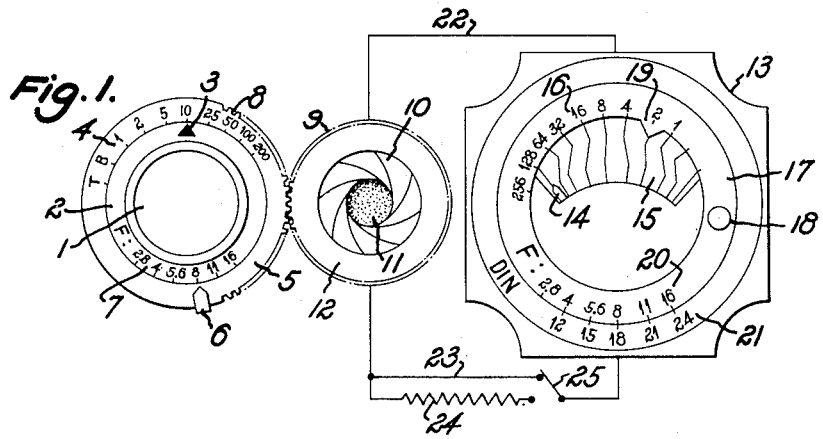

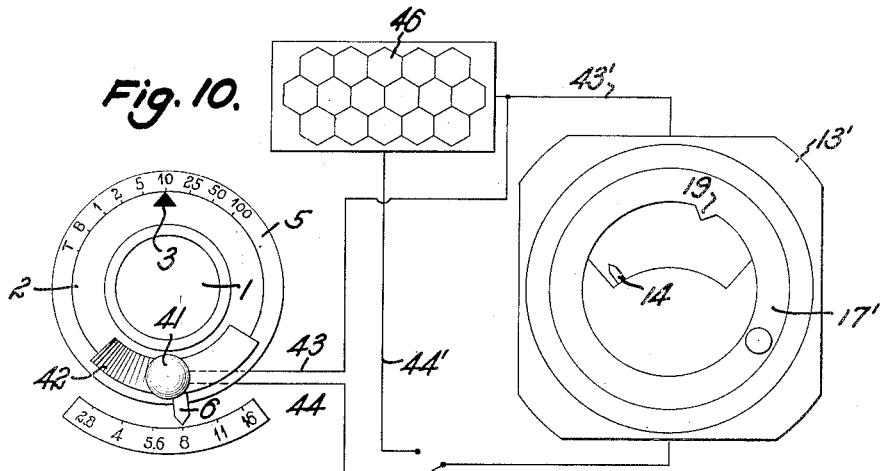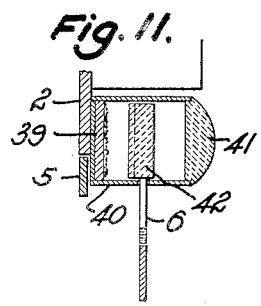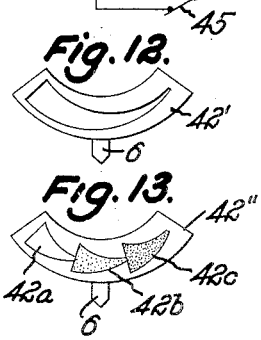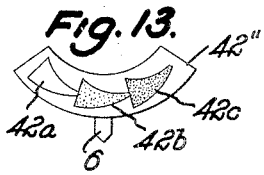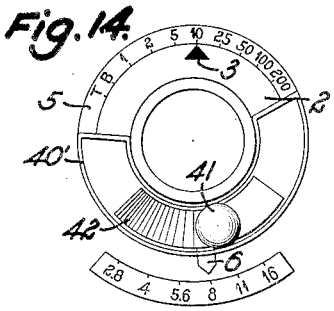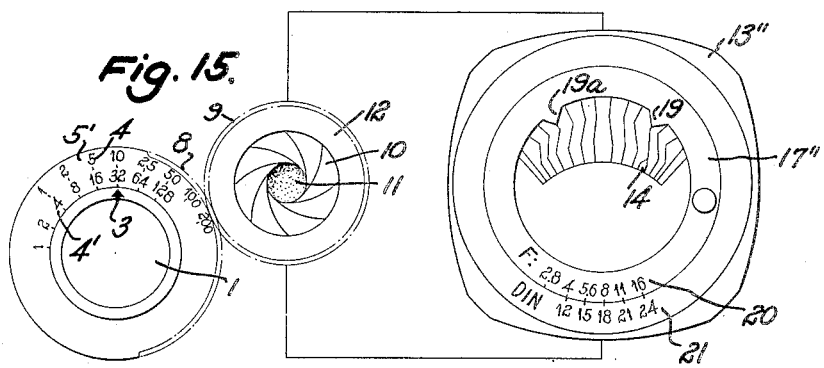

June 9, 1942.   H. F. TÖNNIES   2,285,761
PHOTOGRAPHIC EXPOSURE APPARATUS
Filed Aug. 30, 1938   5 Sheets-Sheet 5
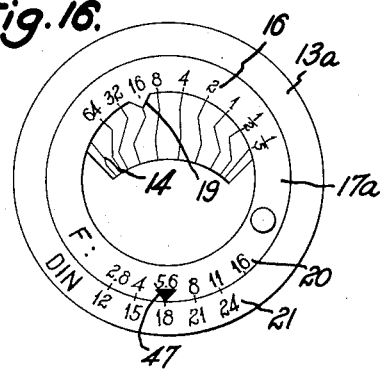
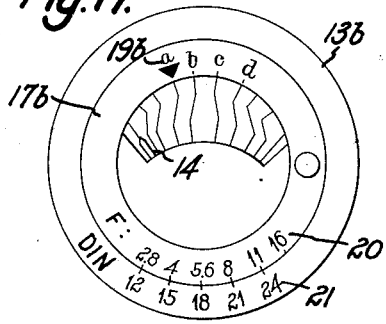
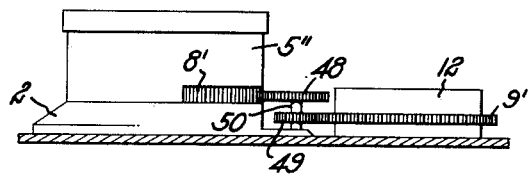
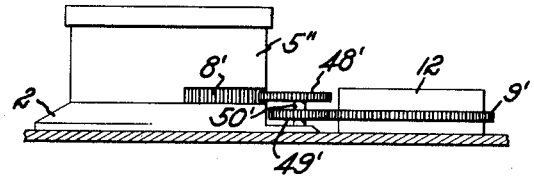
Inventor:
Hans Ferdinand Tönnies,
By Potter, Pierce & Scheffler,
Attorneys.

Patented June 9, 1942

2,285,761

UNITED STATES PATENT OFFICE 2,285,761

PHOTOGRAPHIC EXPOSURE APPARATUS

Hans Ferdinand Tönnies, Hamburg-Grossflottbek, Germany

Application August 30, 1938, Serial No. 227,579
In Germany October 1, 1937

21 Claims. (Cl. 95—10)

This invention relates to photographic exposure apparatus and particularly to apparatus including the shutter mechanism of a still or motion picture camera and exposure-determining equipment that may be operated, in accordance with the brightness of the scene to be photographed, for either a "snap" or instantaneous exposure or for a time or bulb exposure of the negative.

The usual shutter mechanisms include timing mechanism that can be adjusted for an exposure of not more than one second, and longer exposures must be timed by the operator. The control of the shutter speed by the photoelectric cell of an exposure device is, of course, restricted to those relatively short periods of one second or less that are determined by the timing mechanism of the shutter.

An object of the present invention is to provide photographic exposure apparatus of novel design that may be employed for the adjustment of a camera shutter for snapshots or instantaneous exposures under favorable light conditions or, alternatively, for determining the factors of exposure time and diaphragm opening that are appropriate for a manually timed exposure. An object is to provide exposure apparatus including shutter mechanism and exposure mechanism of a plurality of ranges of sensitivity, the exposure mechanism being operated at a lower sensitivity range under favorable lighting conditions for the setting of the shutter mechanism for an automatically timed exposure and at a higher sensitivity under less favorable lighting conditions for determining the exposure factors for a manually timed exposure. Objects are to provide exposure apparatus of the type stated in which the several ranges of sensitivity are obtained by various current-suppressing devices of an electric, photoelectric, optical or mechanical nature.

These and other objects and advantages of the invention will be apparent from the following specification when taken with the accompanying drawings in which:

Figs. 1 to 10, inclusive, are schematic views of different embodiments of the invention;

Fig. 11 is a fragmentary view, in central section, of a photocell unit of Fig. 10;

Figs. 12 and 13 are plan views of light restricting plates that may be used in the device of Figs. 10 and 11;

Fig. 14 is a diagrammatic view of a shutter mechanism and photocell mounting that may be used in the Figs. 12 and 13;

Fig. 15 is a diagrammatic view of another embodiment of the invention;

Figs. 16 and 17 are views of different forms of indicating instruments;

Figs. 18 and 19 are fragmentary side elevations of a form of the invention that is adapted for use with a camera having interchangeable lenses of different image angles.

Figure 7:
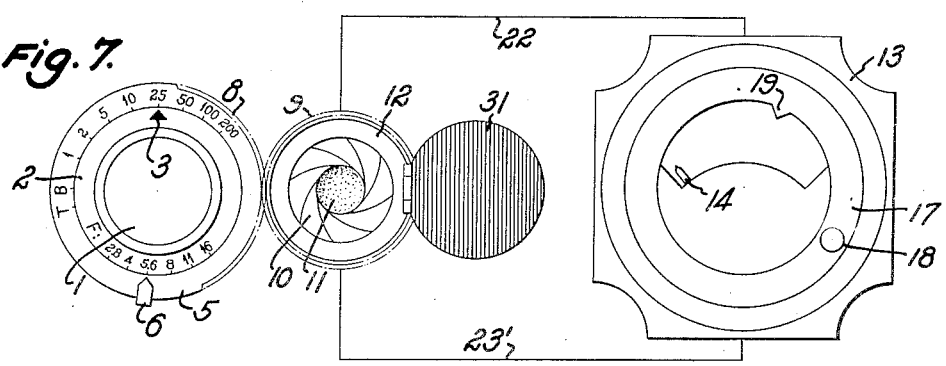

In the several views of the drawings, the reference numeral 1 identifies the camera lens in a housing of the usual type which carries the shutter and diaphragm mechanism. The upper part of the housing has a fixed mark 3 adjacent the shutter speed markings 4 on the adjustable ring 5 of the shutter mechanisms. These markings include the letters T and B for time and bulb exposures and numbers, for example, "1", "2"—"200" indicating 1 second, ½ second—1/200 second. The iris diaphragm, not shown, includes the setting lever or pointer 6 that is adjustable along a scale of graduations 7 on the shutter housing 2.

The shutter setting ring 5 has a crown gear 8 that meshes with a gear 9 which controls the iris diaphragm 10 in front of the photoelectric cell 11, the gear 9 being on or having a flange 12 that forms a part of the housing of the photocell.

The measuring instrument and computer device, identified generally by the reference numeral 13, may be and is illustrated as of the type described and claimed in my copending application "Photoelectric device for the shutter of a camera," Ser. No. 149,019, filed June 18, 1937, now Patent No. 2,185,934 of January 2, 1940. The apparatus includes a sensitive ammeter having a pointer 14 that is movable over a scale plate 15 marked with approximately radial guide lines that extend outwardly to a scale of graduations 16 of exposure periods of from, for example, one second and upward on an indicator ring 17 that may be adjusted angularly by a knob 18. The ring 17 also carries a fiducial mark 19 which overlies the outer edge of the scale plate and serves to indicate the appropriate pointer displacement for automatic timing of the exposure. The lower section of the ring 17 has a scale 20 of diaphragm openings for cooperation with a stationary scale 21 of emulsion speed graduations, for example, "Din" values, on the instrument casing.

A lead 22 extends from one terminal of the cell 11 to the instrument, and the circuit from the other cell terminal to the instrument includes either of the alternative paths formed by the direct connection 23 and a series resistance 24, the choice of the effective path being controlled by a switch 25. The instrument sensitivity, or pointer displacement for a given light energy at the photocell, will of course be substantially higher when the switch 25 is adjusted to include the direct connection 23 in the path of current flow.

The method of operation of the apparatus is as follows. The switch 25 is set to include the resistance 24 in the circuit for snapshots or automatically timed exposures, thus conditioning the apparatus for operation at its lower sensitivity range. The pointer 6 is adjusted for the desired diaphragm opening and the indicator ring 17 of the instrument is adjusted to aline that diaphragm graduation of scale 20 with the emulsion speed number of the graduations 21. The parts as shown in Fig. 1 are set for a diaphragm opening of F8 and a film speed of 18. The shutter speed is then set by directing the camera at the scene and adjusting the ring 5, and thereby the iris diaphragm 10, to bring the instrument pointer 14 into line with the mark 19. In the event that the pointer displacement falls short of the mark 19, a larger lens opening may be selected, and pointer 6 and ring 17 adjusted accordingly.

When the scene brightness is below the value which permits an automatic timing of the shutter at the largest lens opening, or at some preferred smaller lens opening, the shutter control ring 5 is turned to aline either the time or the bulb symbols T, B, respectively, with the fixed mark 3; and the switch 25 is adjusted to include the direct connection 23 in the cell circuit. The desired lens opening is set by pointer 6 and the scale ring 17 of the instrument is adjusted to aline the selected diaphragm marking with the emulsion speed number. The camera is then directed towards the scene, and the proper exposure time is indicated by the position of the instrument pointer 14 with respect to the time scale 16.

The embodiment shown in Fig. 2 differs from the described construction in that the cell 11 and instrument 13 are connected by the low resistance leads 13, 23', and the sensitivity-adjusting resistance 24' and switch 25' are shunted across the instrument. The remaining parts may be substantially as described with reference to Fig. 1. The higher sensitivity range for measuring relatively long exposure times is obtained by opening the switch 25' to exclude the resistance 24' from the circuit.

The embodiment shown in Fig. 3 is similar to that of Fig. 1, but is designed for a preliminary selection of the shutter speed and a subsequent adjustment of the diaphragm opening in accordance with the particular scene brightness and the film speed. The crown ring 8' which meshes with the ring 9 of the iris diaphragm 10 of the photocell is secured to the diaphragm pointer 6 and the instrument 13' has an indicator ring 17' which carries a scale 20' of shutter speeds corresponding to the graduations 4 of the shutter adjusting ring 5. The ring 17' has a pointer 19 and time scale 16, in seconds, similar to those of ring 17 of Fig. 1. The ring 17' also has a mark 26 that is to be alined with the film speed number of scale 21 for the measurement of the longer exposure times.

The setting of the exposure mechanism for automatic shutter timing is as follows. The desired exposure time value, for example ½₅ second, is alined with mark 3 by turning the ring 5 of the shutter mechanism, and the same value on scale 20' is alined with the film speed value. The camera is focused on the scene and the diaphragm lever 6 is adjusted, and thereby gears 8', 9' and the iris diaphragm 12, until the instrument pointer alines with the mark 19. For manual shutter control, the diaphragm lever 6 is set for the largest lens opening and indicator ring 17' is turned to aline the mark 26 with the film speed value on scale 21. The switch 25 is turned to the direct connection 23 that provides higher sensitivity by removing the resistance 24. The camera is then focused on the scene and the exposure time for the largest lens opening is read directly from the pointer position on scale 16 of ring 17'. The corresponding exposure time for other diaphragm openings may be obtained from tables or computed mentally.

The apparatus shown in Fig. 4 is similar to that of Fig. 3 in that the shutter speed is selected and the diaphragm opening is then adjusted; but the Fig. 4 apparatus includes an electrical system for varying the current output of the cell with the adjustment of the diaphragm. This current modulating system includes the lead 27 from the photocell 11 to the slider 28 that is fixed to the diaphragm lever 6 and displaceable along a resistance 29. The two sensitivity ranges are obtained, as in Figs. 1 and 3, by the alternative direct connection path 23 and resistance path 24 which are controlled by the switch 25.

The embodiment shown in Fig. 5 is similar to that of Fig. 4 except that the shunt resistance 24' and switch 25' are used, as in the Fig. 2 circuit, for altering the sensitivity of the apparatus.

It will be apparent that the switch for altering the sensitivity may be a part of or actuated by the shutter or diaphragm mechanism. The apparatus as shown in Fig. 6 includes the resistance 29 and slider 28, as in Figs. 4 and 5, for varying the photocell output as a function of the diaphragm setting, and the instrument 13' is as shown in detail in Fig. 3. The resistance 24" for adjusting sensitivity is in series with the resistance 29 and forms, in effect, an extension of resistance 29. The lens mount 2 carries a mark 30, at the left of the largest diaphragm marking, to which the diaphragm lever 6 is set when the exposure apparatus is to be used for determining the shutter timing for a manually controlled exposure. This adjustment of the diaphragm lever 6 displaces the contact slider 28 to the left hand terminal of the resistance 24" and thus excludes resistances 29 and 24" from the measuring circuit. The adjustment of the lever 6 for the largest diaphragm opening includes all of the sensitivity adjusting resistance 24" in the circuit, and the adjustment of the lever 6 for a smaller opening includes a part of the modulating resistance 29 in series with the resistance 24".

The sensitivity adjustment for automatic or manual shutter timing may be effected by optical means in place of the electrical or resistance means of the previously described embodiments of the invention. As shown in Fig. 7, the apparatus and circuit connections are substantially as shown in Fig. 2, but the shunt resistance of Fig. 2 is replaced by a movable light filter or transparent light absorbing plate 31. The filter is preferably hinged to a stationary part of the photocell housing 12 and does not move with the crown ring 9 that adjusts the iris diaphragm 10.

Figure 8:
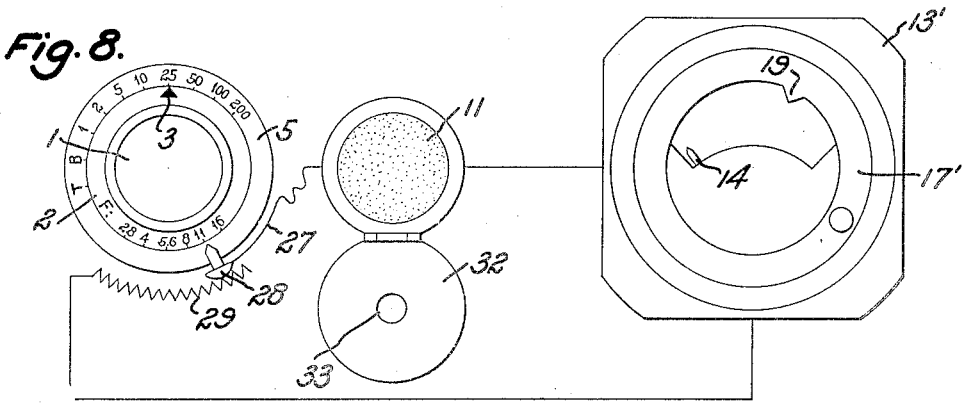

Another mechanical system for adjusting sensitivity, as shown in Fig. 8, comprises the flap or shutter 32 that has one or more openings 33 for restricting the light energy reaching the photocell when the apparatus is used to determine an automatically timed exposure. The openings also reduce the acceptance angle of the cell. The shutter 32 is illustrated in association with apparatus of the type in which the shutter speed is selected and the diaphragm is then adjusted in accordance with the scene brightness but it is to be understood that the shutter 32 may be used with the type in which the diaphragm is selected and the shutter speed is then adjusted and, alternatively, the filter plate 31 of Fig. 7 may be used in place of the shutter 32 in Fig. 8.

Figure 9:
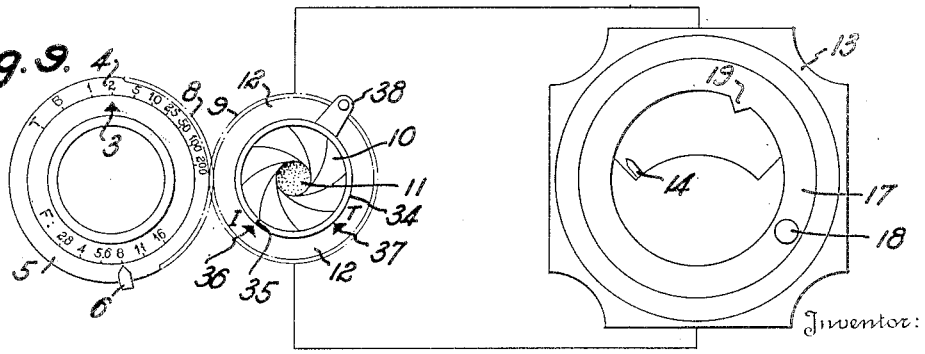

Another mechanical system for sensitivity adjustment, as shown in Fig. 9, comprises an additional control ring 34 for the iris diaphragm 10 in front of the photocell 11. The control ring 34 is adjustable with respect to, and movable with, the flange 12 that is fixed to the crown gear 9. The ring 34 has a mark 35 that may be alined with either of the marks 36, 37 on the flange 12 which, as indicated by the letters "I" and "T," correspond to instantaneous or time exposures, respectively. The ring 34 has a projecting handle 38 to facilitate the manual adjustment of the ring. For instantaneous or automatically timed exposures, the handle 38 is turned to aline the mark 35 on ring 34 with the mark 36, as shown in the drawings. This initial adjustment of the ring 34 effects a partial closure of the iris diaphragm 10 for any setting of the crown gear 9. For manually timed exposures, the handle 38 is turned counterclockwise to aline the marks 35 and 37, thus partially opening the diaphragm to provide a fully opened diaphragm when the shutter control ring 5 is turned to set either mark T or mark B of scale 4 in line with the fiducial mark 3.

The change in sensitivity or current strength may also be effected by photoelectric cells of different size or by a choice of the number of photocells that are connected to the instrument. As shown in Figs. 10 and 11, a small photoelectric cell 39 is mounted at the inner end of a housing 40 which has a highly refractive lens 41 at its outer end, the housing being fixed to the camera lens housing 2. The lens 41 restricts the spread of the light rays that reach the cell to a predetermined angle α. A light restricting plate 42 in the form of a section of an annulus, and of progressively varying light transmission from end to end is located between the cell 39 and lens 41, and is connected to the diaphragm lever 6. As indicated by the lining on the plate 42 of Fig. 10, the plate may be clear at the right end and colored progressively towards the other end, or increasing light absorption may be otherwise obtained.

A lead 43 extends from the cell 39 to the instrument 13', and the second lead 44 extends to a contact of the sensitivity adjusting switch 45. A larger photocell unit 46 has leads 43', 44' extending to the instrument and to another contact of the switch 45. The photocell unit has a larger acceptance angle than that of the cell 39 and is preferably of the type, as described and claimed in my prior Patent No. 2,067,843, in which a multiple lens plate is used, either with or without shallow baffle chambers, to determine the acceptance angle of the cell.

As shown in Figs. 12 and 13, the light restricting element may be a plate 42' having a single opening of tapering width or a plate 42" having a plurality of tapered openings in a row, with light absorbing filters 42a, 42b, 42c, of different values in the several openings.

The construction shown in Fig. 14 is similar to that of Fig. 10, but the arcuate housing 40' for the small photoelectric cell is secured to and moves with the shutter timing ring 5. The light restricting plate 42', as shown in Fig. 12, is connected to and moves with the diaphragm lever 6. The cell output is therefore varied, for a given scene brilliance, with the adjustment of both the shutter timing and the diaphragm size. The instrument for use with this type of cell mounting and current control may be of either of the described types, i. e. instrument 13 of Fig. 1 with a scale 20 of diaphragm openings, or instrument 13' of Fig. 3 with a scale 20' of shutter speeds.

The method of use of the devices illustrated in Figs. 10 to 14 will be obvious from the previous descriptions. The switch 45 is set to connect only the smaller photocell unit to the instrument for determining automatically timed exposures, and to connect the larger photocell unit, or if desired both units, to the instrument for determining longer exposure times. The larger photoelectric unit may, of course, be made in sections for the best utilization of the available space on or in the camera casing.

As shown in Fig. 15, the adjustment for different sensitivities may be had mechanically in another manner. The general arrangement is similar to that of Fig. 1, but the resistance adjustment is eliminated by the use of a different system of scales or graduations. The indicating instrument 13" has a ring 17" which carries a scale 20 of stop openings adjacent the fixed scale 21 of emulsion speeds, and the fiducial mark 19 which indicates the appropriate pointer position for an automatically timed exposure. The ring 17" does not have a scale of exposure time but carries a second mark 19a that is angularly displaced from the mark 19 in the direction of zero pointer position. The shutter adjusting ring 5' has the usual graduations 4 of automatic shutter speeds of one second and less, and an inner set of graduations 4' of exposure times in seconds.

For automatically timed exposures, the selected diaphragm stop is set by a lever 6 and the same stop value of scale 20 is alined with the emulsion speed number of scale 21. The camera is focused on the scene, and the shutter timing ring 5' is turned until the iris diaphragm 10 of the cell 11 reaches that adjustment for which the instrument pointer alines with the fiducial mark 19. The shutter is thereby adjusted for the proper timing of an instantaneous exposure. If the pointer does not reach the mark 19 when the shutter ring 5' is set for the longest instantaneous exposure, the picture must be taken with a manually timed exposure. The appropriate time is determined by adjusting the ring 5' to bring the pointer into line with the mark 19a. The length of the exposure is indicated by the value, in seconds, on scale 4' that is opposite the mark 3 of the shutter mechanism.

A form of indicating instrument that may be used in place of instrument 13 of Fig. 1 is illustrated in Fig. 16. The instrument 13a has scales 16, 20 and 21, as previously described, but the ring 17a has an additional mark 47 that is to be set opposite the emulsion speed number of scale 21 for a manually timed exposure. The position of pointer 14 along the scale 16 indicates the exposure time for the largest diaphragm opening The time for smaller openings may be determined from charts or computed.

Many small picture cameras have interchangeable lenses of different light values. The apparatus may be adapted for use with such cameras by placing additional pointer-setting marks on the indicating ring 17b of the instrument 13b. As shown in Fig. 17, a series of marks 19b replace the single mark 19 of the previously described instruments. The more prominent mark "a" indicates the adjustment position when using what may be termed a "standard" camera lens of average image angle or light value. The auxiliary marks "b", "c", etc., indicate adjustments for lenses of smaller image angle or light value.

A selective adjustment of the iris diaphragm of the photocell unit may also be employed to obtain the proper shtter adjustment for camera lenses of different image angles. The electrical circuits of the apparatus shown in Figs. 18 and 19 may be assumed to be the same as those of Figs. 1 or 2. The gear 9' for adjusting the iris diaphragm in the cell housing 12 is not meshed directly with the crown gear 8' of the shutter adjusting sleeve 5", but the transmission is through the gears 48, 49 on a shaft 50. The gear ratio is selected in accordance with the acceptance angle of the camera lens and, as shown in Fig. 20, a different set of gears 48', 49' on a shaft 50' may be substituted when a different lens is to be used.

It is to be understood that the several drawings are diagrammatic and that the actual physical constructions will vary materially in accordance with the design of the cameras to which the invention is applied. The various illustrated embodiments of the invention indicate that there is considerable latitude in the construction of "built-in" exposure meters having two ranges of sensitivity or current values for determining automatically timed or manually timed exposures.

I claim:

1. Exposure determining apparatus comprising photoelectric means, a measuring instrument having a pair of relatively adjustable indicating members and a pointer displaceable in accordance with current flow through said instrument, circuit connections between said photoelectric means and said instrument, means for adjusting the sensitivity of said instrument with respect to illumination at the photoelectric means to a higher or alternatively a lower value, and means calibrated in values of one of the exposure factors of shutter timing and diaphragm opening to modulate current flow from said photoelectric means to said instrument; one of said indicating members having for cooperation with said instrument pointer a pair of indicia comprising a mark and a scale graduated in values of the exposure factor in which said current modulating means is calibrated, and said indicating members have cooperating scales graduated respectively in the second of said exposure factors and in a third exposure factor for setting the indicia-bearing indicating member in accordance with selected values of the exposure factors in which said cooperating scales are graduated.

2. Exposure determining apparatus as claimed in claim 1, wherein the scale of said indicia-bearing indicating member is graduated in values of shutter timing for manually controlled exposures.

3. Exposure determining apparatus as claimed in claim 1, wherein one of said cooperating scales of said indicating members is graduated in shutter timing values corresponding to manually timed exposures.

4. Apparatus as claimed in claim 1, wherein said sensitivity adjusting means comprises an electrical resistance and switch means for including the same in or alternatively for excluding the same from the circuit connections between said photoelectric means and said instrument.

5. Apparatus as claimed in claim 1, wherein said sensitivity adjusting means comprises an electrical resistance and switch means for including the same in series in or alternatively for excluding the same from the circuit connections between said photoelectric means and said instrument.

6. Apparatus as claimed in claim 1, wherein said sensitivity adjusting means comprises an electrical switch in said circuit connections.

7. In exposure determining apparatus, photoelectric means, a measuring instrument having a pointer and adjustable indicator means, said indicator means including relatively adjustable members carrying respectively a fiducial mark for cooperation with the instrument pointer and a scale of emulsion speeds, circuit connections between said photoelectric means and said instrument, and sensitivity control means for adjusting the current output of said photoelectric means to different ranges of current values; said sensitivity control means comprising a light transmitting filter plate, and means supporting said plate for movement into and out of the path of light rays approaching said photoelectric means.

8. Apparatus as claimed in claim 1, wherein said photoelectric means comprises a plurality of photoelectric cells, and said sensitivity adjusting means comprises a switch for selectively connecting one or the other of said photoelectric cells in circuit with said instrument.

9. Apparatus as claimed in claim 1, wherein said photoelectric means comprises a plurality of photoelectric cells of different current-generating capacities, and said sensitivity adjusting means comprises a switch for selectively connecting one or the other of said photoelectric cells in circuit with said instrument.

10. Exposure determining apparatus comprising photoelectric means, a measuring instrument having a pointer and an adjustable indicating member carrying a mark and a scale of exposure time graduations corresponding to manually controlled exposure times, means having indicia cooperating with indicia on said adjustable member for setting the latter in accordance with selected values of diaphragm opening and a third exposure factor, means for modulating the current output of said photoelectric means in accordance with values of shutter speed corresponding to automatically timed exposures, and means for adjusting the sensitivity of the measuring instrument with respect to illumination at said photoelectric means between a lower and a higher value for which, respectively, the shutter speed for an automatically timed exposure may be determined by adjusting said modulating means to aline said pointer with said mark or the exposure time for a manually timed exposure is indicated by the position of said pointer along said scale of exposure time graduations.

11. Exposure determining apparatus as claimed in claim 10, wherein said indicating means includes means supporting said mark and exposure time scale for angular adjustment with respect to the path of pointer displacement, and a scale of emulsion speeds and cooperating means for setting the mark and exposure time scale.

12. Exposure determining apparatus comprising photoelectric means, a measuring instrument having a pointer and an indicating member carrying a pair of indicator means adjacent the path of pointer displacement, means for adjusting the current output of said photoelectric means to different ranges of current values, means for modulating the current flow in accordance with variations in one of the exposure factors of exposure time and diaphragm opening, and means for setting said indicator member in accordance with a selected value for the other exposure factor; one indicator means being a mark which identifies the appropriate pointer position for an instantaneous exposure when said current output adjusting means is set for one range of current values and the other indicator means being a scale graduated in values of that exposure factor in accordance with which current flow is modulated for cooperation with the pointer when the current output adjusting means is set for a higher range of current values.

13. Apparatus as claimed in claim 12, wherein said means for adjusting the current output of the photoelectric means comprises a plurality of photoelectric cells of different current-generating capacities, and said current-modulating means varies the current output of a smaller photoelectric cell.

14. Apparatus as claimed in claim 12, wherein said current-modulating means comprising optical means for progressively darkening the photoelectric means.

15. Apparatus as claimed in claim 12, wherein said current-modulating means comprising a plate of progressively varying light absorbing properties from one end thereof to the other.

16. Apparatus as claimed in claim 12, wherein said current-range adjusting means comprises means for adjusting the effective acceptance angle of the photoelectric means.

17. Apparatus as claimed in claim 12, wherein said photolectric means comprises two photoelectric cells of different current-generating capacities, and means restricting the acceptance angle of the cell of lesser current-generating capacity to a smaller value than that of the other cell; and said current-range adjusting means comprises switch means for connecting the cell of greater current-generating capacity to or disconnecting the same from said measuring instrument.

18. In exposure determining apparatus, the combination with a photoelectric cell, of a measuring instrument connected to said cell, and sensitivity control means for adjusting the current flow from the cell to the measuring instrument to a higher and a lower range of values; said measuring instrument including a casing, an angularly-movable pointer, an indicator ring having a fiducial mark and a scale of relatively long exposure times, cooperating sets of markings on said indicator ring and the casing to indicate appropriate adjustment of said indicator ring with respect to the path of pointer displacement, one set of markings being a scale of graduations of one of the exposure factors of diaphragm opening and shutter speed, the other set of markings including a scale of emulsion speeds, means adjustable to modulate the current flow to the measuring instrument when said sensitivity control means is adjusted for the lower range of values of current flow to said measuring instrument, and a scale of graduations of the other of said exposure factors cooperating with said adjustable modulating means.

19. The invention as claimed in claim 18, wherein said first scale of graduations comprises values indicative of diaphragm openings.

20. The invention as claimed in claim 18, wherein said second set of markings includes a mark for setting at the appropriate emulsion speed value to condition the apparatus for an indication of a relatively long exposure time for a manual control of the camera shutter.

21. In apparatus for determining exposure data for photographic cameras; the combination with a measuring instrument having a pointer and an adjustable indicator member, a mark carried by said indicator member to indicate a desired pointer position, graduations of one of the exposure factors, viz. shutter speed and diaphragm opening, on said adjustable indicator member, and a scale of emulsion speeds for cooperation with said exposure factor graduations; a photoelectric cell; and means adjustable to vary the cell output current independently of the light intensity at the cell, said adjustable means including means adapted to be coupled to the setting member of a camera exposure system that controls the magnitude of the second of said exposure factors; of means for adjusting the sensitivity of the exposure apparatus to a plurality of range, indicating means on the adjustable indicator member and additional to said mark carried thereby; the pointer position with respect to said additional indicating means being indicative of relatively long exposure time when the apparatus is adjusted for a higher sensitivity, and the position of said adjustable means at which the pointer alines with said mark indicating shutter speeds when the apparatus is adjusted for a lower sensitivity.

HANS FERDINAND TÖNNIES.